United States Patent
Sawada et al.

(12) 
(10) Patent No.: US 6,310,117 B1
(45) Date of Patent: Oct. 30, 2001

(54) METHOD FOR COATING WAX OR RESIN PARTICLES WITH METALLIC SOAP

(75) Inventors: Kouhei Sawada; Show Onodera, both of Hyogo (JP)

(73) Assignee: NOF Corporation (JP)

( * ) Notice: Subject to any disclaimer, the term of this patent is extended or adjusted under 35 U.S.C. 154(b) by 0 days.

(21) Appl. No.: 09/526,097

(22) Filed: Mar. 15, 2000

(30) Foreign Application Priority Data

Mar. 16, 1999 (JP) .................................................. 11-070438

(51) Int. Cl.$^7$ ................................. C08K 9/04; C08J 3/05; B32B 27/00
(52) U.S. Cl. .......................... 523/200; 528/488; 528/489; 427/222; 428/403
(58) Field of Search ............................ 523/200; 528/488, 528/489; 427/222; 428/403

(56) References Cited

U.S. PATENT DOCUMENTS 5,248,581 * 9/1993 Nakayama et al. .
5,621,023 * 4/1997 Nishimura et al. .
6,060,553 * 5/2000 Lenczyk et al. .

FOREIGN PATENT DOCUMENTS

| 58100857 | 12/1981 | (JP) . |
| 57063336A | 4/1982 | (JP) . |
| 59229567 | 2/1983 | (JP) . |
| 62234541 | 4/1986 | (JP) . |
| 03243639A | 10/1991 | (JP) . |
| 04220441A | 8/1992 | (JP) . |
| 6242627 | 2/1993 | (JP) . |
| 8182927 | 12/1994 | (JP) . |
| 9328559 | 2/1997 | (JP) . |

* cited by examiner

Primary Examiner—Tae H. Yoon
(74) Attorney, Agent, or Firm—Amin & Turocy, LLP

(57) ABSTRACT

The present invention provides a method for coating wax or resin particles with metallic soap, wherein (a) a water dispersion of wax or resin particles, the dispersion containing water-soluble fatty acid soap, and (b) an aqueous solution or a water dispersion of a polyvalent metal compound are mixed in such a manner that an equivalent ratio of the polyvalent metal compound to the water-soluble fatty acid soap is 0.5 to 1.5.

15 Claims, 4 Drawing Sheets

METHOD FOR COATING WAX OR RESIN PARTICLES WITH METALLIC SOAP

BACKGROUND OF THE INVENTION

1. Field of the Invention

The present invention relates to a method for coating wax or resin particles with metallic soap. The present invention further relates to metallic-soap-coated wax or resin particles having anti-blocking properties obtained by the method.

2. Description of the Prior Art

Wax or resin particles are utilized widely as a lubricant, a modifier, an additive or the like. In particular, in the field of toners for electrophotography, wax or resin particles serve as important elements: for example, wax particles are used as an external additive or an internal additive, and resin particles are used as a carrier of toner or a fixing agent.

In this context, in recent years there has been an increasing demand for the improvement of the resolution of an image formed of toner and full colorization of toner, and the dot size has been miniaturized. Under these circumstances, the particle size of wax or resin particles used as an additive or toner carrier is also required to be miniaturized to 50 µm or less or even 25 µm or less.

However, since fine particles of wax or resin are likely to cause blocking, some problems, such as failure to form a complete image due to the blocking of the particles, have started to arise with the development of the miniaturization of the particle size.

In order to prevent this blocking, an attempt to coat the surfaces of wax or resin particles with metallic soap has been made. For example, the surfaces of the wax or resin particles are coated using the following methods: a method of coating the particle surfaces with powder metallic soap in a mixing granulating machine such as a High Speed mixer (Mitsui Mining Co., Ltd.) and a Marumerizer (Fuji Paudal Co., Ltd.); and a wet coating method which adds metallic soap in the form of water dispersion to the particles and dries the resultant product so as to coat the surfaces of the particles with the metallic soap (e.g., Japanese Laid-Open Patent Publication Nos. 58-100857, 8-182927, and 9-328559). Furthermore, various methods for coating the particle surfaces with metallic soap have been proposed to prevent the blocking of the particles used in photography or other applications. Examples of proposed methods include a method of coating the particle surfaces with metallic soap with a V-blender so as to produce a developer for an electronic copying machine (Japanese Laid-Open Patent Publication No. 59-229567); a method of coating the surface of a pigment with silicone oil, resin, metallic soap or the like to make the surface of the pigment lipophilic so as to produce color microcapsules (Japanese Laid-Open Patent Publication No. 62-234541); and a method of fixing fatty acid metallic soap to the surface of toner by the method of the mechanical mixing so as to produce microcapsule toner (Japanese Laid-Open Patent Publication No. 6-242627).

In order to coat the particles with metallic soap uniformly by these conventional methods, in general, the desirable particle size of the metallic soap added is at least one-fifth or smaller, preferably one-twentieth or smaller than that of the particles to be coated with the metallic soap. However, the particle size of industrially available metallic soap at present is 5 to 50 µm. Therefore, it is not easy to coat wax or resin particles having a particle size of 100 µm or smaller by the conventional methods, and it is very difficult to uniformly coat particles having a particle size of 25 µm or smaller by the conventional methods.

For this reason, although metallic soap has excellent lubricating properties, release properties, and anti-moisture absorption as an anti-blocking agent, the metallic soap cannot be used for coating the surface of wax or resin particles having a particle size of 50 µm or smaller or even 25 µm or smaller. Therefore, the metallic soap cannot be used in the field of toner for high definition electrophotography.

SUMMARY OF THE INVENTION

As a result of great efforts made to solve the above-described problems, the inventors of the present invention found that microparticles covered with a layered or scaly coating of metallic soap can be obtained by mixing a water dispersion of wax or resin particles dispersed in water, using water-soluble fatty acid soap as a dispersant, and an aqueous solution or a dispersion of a polyvalent metal compound.

More specifically, the present invention is directed to a method for coating wax or resin particles with metallic soap, wherein (a) a water dispersion of wax or resin particles, the dispersion containing water-soluble fatty acid soap, and (b) an aqueous solution or a water dispersion of a polyvalent metal compound are mixed in such a manner that the equivalent ratio of the polyvalent metal compound to the water-soluble fatty acid soap is 0.5 to 1.5.

In a preferred embodiment, the above-mentioned wax or resin particles are contained in an amount of 0.1 to 50 wt % in the water dispersion (a) of wax or resin particles, and the water-soluble fatty acid soap is contained in an amount of 0.1 to 20 parts by weight per 100 parts by weight of the wax or resin particles.

In a preferred embodiment, the polyvalent metal compound is contained in an amount of 0.01 to 30 wt % in the aqueous solution or the water dispersion (b).

The present invention further relates to wax or resin particles coated with metallic soap obtained by the steps of: (i) mixing (a) a water dispersion of wax or resin particles, the dispersion containing water-soluble fatty acid soap, and (b) an aqueous solution or a water dispersion of a polyvalent metal compound in such a manner that an equivalent ratio of the polyvalent metal compound to the water-soluble fatty acid soap is 0.5 to 1.5; and (ii) recovering the resultant wax or resin particles coated with metallic soap.

Thus, the invention described herein makes possible the advantages of: (1) providing a method for coating fine particles of wax or resin with metallic soap uniformly in order to obtain coated particles which can be used in various industrial fields such as electronics, information, medicine and pharmacy, cosmetics, and resin processing, in particular, in the field of toner for high definition electrophotography; and (2) providing metallic-soap-coated wax or resin particles having anti-blocking properties obtained by the method.

These and other advantages of the present invention will become apparent to those skilled in the art upon reading and understanding the following detailed description with reference to the accompanying figures.

DESCRIPTION OF THE PREFERRED EMBODIMENT

Figure 1:
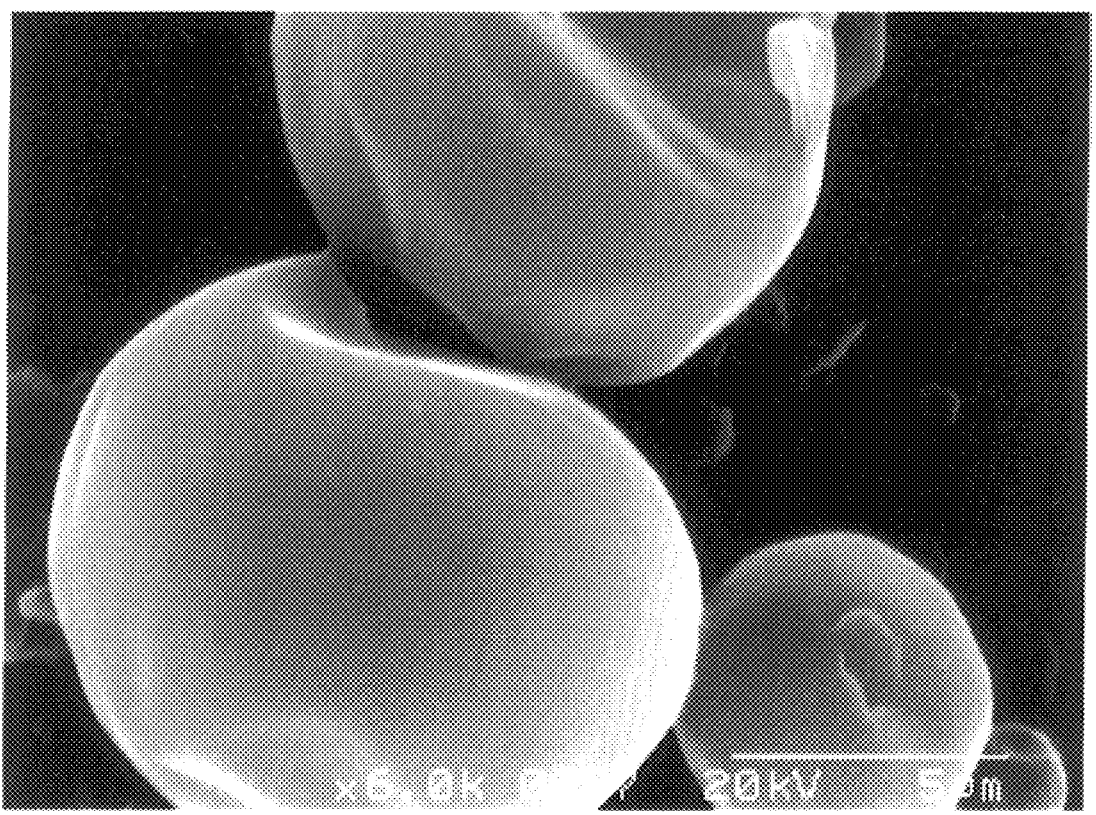
FIG. 1 is an electron micrograph showing the surface structure of wax particles in a water dispersion 1 before a metallic soap coating treatment.

The water-soluble fatty acid soap used in the present invention is an alkali metal salt, an ammonium salt, or a water-soluble amine salt of fatty acid having, preferably 4 to 30 carbon atoms, more preferably 6 to 22 carbon atoms. The water-soluble fatty acid soap can be used alone or in combination.

When a fatty acid having less than 4 carbon atoms is used, the produced metallic soap may be water-soluble so that the wax or resin particles cannot be coated with the metallic soap. When a fatty acid having more than 30 carbon atoms is used, the water solubility of the fatty acid salt is excessively low, so that the fatty acid salt tends to be hardly dissolved in the water dispersion system.

Preferable examples of the fatty acid include saturated fatty acids such as butyric acid, caproic acid, caprylic acid, capric acid, lauric acid, myristic acid, palmitic acid, stearic acid, arachic acid, behenic acid, lignoceric acid, cerotic acid and montanoic acid; unsaturated fatty acids such as butenoic acid, octenoic acid, caproleic acid, undecylenic acid, myristoleic acid, palmitoleic acid, oleic acid, erucic acid, linoleic acid, linolenic acid, arachidonic acid and docosahexaenoic acid; branched-chain fatty acids such as α—methylbutyric acid and isostearic acid; and fatty acids having hydroxyl groups such as sabinic acid, ricinoleic acid, and hydrogenated fatty acids from castor oil.

Examples of alkali metals included in the alkali metal salt mentioned above include lithium, sodium, and potassium. Among these, sodium or potassium can be used suitably.

Examples of water-soluble amines included in the water-soluble amine salt mentioned above include water-soluble alkylamines such as methylamine, ethylamine, propylamine, dimethylamine, diethylamine, dipropylamine and trimethylamine; polyethylene polyamines such as ethylenediamine, diethylenetriamine and triethylenetetramine; and alkanolamines such as monoethanolamine, diethanolamine and triethanolamine. Among these, alkanolamines are preferable.

The water-soluble fatty acid soap is contained in the water dispersion (a) in an amount of 0.1 to 20 parts by weight per 100 parts by weight of the wax or resin particles. Preferably, the water-soluble fatty acid soap is contained in an amount of 1 to 10 parts by weight, more preferably 2 to 8 parts by weight, and most preferably 4 to 5 parts by weight per 100 parts by weight of the wax or resin particles. When the amount of the water-soluble fatty acid soap is excessively small, the metallic soap layer for coating is excessively thin, so that it is difficult to achieve a uniform coating. When the amount of the water-soluble fatty acid soap is too large, the metallic soap layer produced on the surfaces of the particles is excessively thick, so that aggregation is caused with adjacent particles, and it is difficult to achieve an efficient coating.

In the present invention, as the wax or resin particles that are contained in the water dispersion (a) and are to be coated with metallic soap, any organic compound particles can be used, as long as they are insoluble in water. In particular, particles of an organic compound that is solid at room temperature. When such particles are used, the surface of the particles can be coated with the metallic soap uniformly. Specific examples of such an organic compound include waxes such as paraffin wax, fatty acid, alcohol wax, ester waxes, amide waxes, and natural waxes, and resins such as hydrocarbon resins, acrylic resins, vinyl resins, phenol resin, epoxy resins, polyester resins, polyamide resins, and mixtures thereof.

The particles of these waxes or resins can be used alone or in combinations of two or more. The particles of these waxes or resins can comprise a plasticizer, a lubricant, a pigment or the like in an amount that does not impair the feature of the present invention. A typical example thereof is wet toner particles of functional resin containing a lubricant, a pigment, a charge control agent or the like and having lubricating properties itself. There is no limitation regarding the particle size of the wax or resin particles used in the present invention. Generally, wax or resin particles having a diameter of 1–500 μm can be used. However, the features of the present invention can be distinguished best when particles having a particle size of 25 μm or less, which are difficult to be coated in the conventional methods, are used.

The ratio of the wax or resin particles with respect to the total amount of the water dispersion (a) is preferably 0.1 to 50% by weight, more preferably 1 to 30% by weight. When the ratio of the wax or resin particles is smaller than 0.1% by weight, the production efficiency may deteriorate. When the ratio is larger than 50% by weight, the viscosity of the water dispersion (a) is excessively large, so that the handling may be difficult.

The polyvalent metal compound included in an aqueous solution or a water-dispersion (b) used in the present invention is an ionic metal compound (e.g., a metal salt) of a bivalent metal or metals with more valences. Examples of metals forming such a metal compound include alkaline-earth metals such as beryllium, magnesium, calcium, strontium and barium; transition metals such as titanium, vanadium, chromium, manganese, iron, cobalt, nickel, copper, zinc, zirconium, molybdenum, palladium, silver, cadmium, tungsten and mercury; and other metals such as aluminum, gallium, tin, lead, and lanthanoid metals.

Among these, magnesium, calcium, barium, manganese, iron, nickel, copper, zinc, silver and tin are preferable for general production. This is because such a metal in the polyvalent metal compound can be exchanged with a cation formed from the water-soluble fatty acid soap in high velocity in an aqueous medium so that metallic soap can be easily formed in water. A metal class used for the present invention can be selected suitably depending on the need of the field where the resultant coated particles are to be used.

The polyvalent metal compound, which is an ionic metal compound, used in the present invention comprises an oxide, a hydroxide or a salt of the above-listed metals. There is no limitation regarding the acid forming the salt. Examples of the acid include inorganic acids such as hydrochloric acid, nitric acid, sulfuric acid, phosphoric acid, boric acid, nitrous acid, sulfurous acid, phosphorous acid, hypochlorous acid, hypophosphorous acid, perchloric acid, persulfuric acid carbonic acid and percarbonic acid. The polyvalent metal compound can be used alone or in combination.

The content of the polyvalent metal compound in the aqueous solution or water dispersion of the polyvalent metal compound (b) is preferably 0.01 to 30% by weight, more preferably 0.05 to 10% by weight, based on the total amount of the aqueous solution or water dispersion (b). When the content of the polyvalent metal compound is smaller than 0.01% by weight, coating may be insufficient. Moreover, this is economically disadvantageous because large-scale production equipment is required, resulting in low production efficiency. When the content is larger than 30% by weight, it is difficult to mix it with the water dispersion (a) uniformly for a short period, so that it is difficult to achieve efficient coating.

The polyvalent metal compound used in the present invention is used in such an amount that the equivalent ratio of the metal ions in the polyvalent metal compound with respect to the water-soluble fatty acid soap is preferably 0.5 to 1.5, more preferably 0.8 to 1.2.

When the equivalent ratio of the metal ions is smaller than 0.5, the water-soluble fatty acid soap is present in the system in a large amount, so that the filtering properties may deteriorate when collecting the wax or resin particles coated with the metallic soap. When the equivalent ratio is larger than 1.5, complicated operations may be required to remove the residual polyvalent metal compound.

Hereinafter, a method for producing wax or resin particles coated with the metallic soap of the present invention will be described.

There is no limitation regarding the method for preparing the water dispersion of wax or resin particles containing water-soluble fatty acid soap (a) (hereinafter, may be referred to as dispersion (a)). For example, a forced dispersion method, a wet milling method, an emulsion dispersion method, an emulsion polymerization method or the like can be used.

The forced dispersion method refers to the following method. Wax or resin is pulverized by a known pulverizer such as a ball mill, a sand mill, or a jet mill into microparticles. Then, the microparticles and a predetermined amount of water-soluble fatty acid soap and a predetermined amount of water are mixed and dispersed by a known dispersing machine such as a paddle agitator, homogenizer, a ball mill, a sand mill, or a jet mill. Thus, a water-dispersion is prepared.

The wet milling method refers to the following method. Wax or resin, a predetermined amount of water-soluble fatty acid soap and a predetermined amount of water are fed into a known pulverizer such as a ball mill, pearl mill or disk mill, where the wax or resin is dispersed while being pulverized. Thus, a water dispersion is prepared.

The emulsion-dispersion method refers to the following method. Predetermined amounts of wax or resin, water-soluble fatty acid soap and water are fed into a container with an emulsion dispersing device, and heated to a temperature equal to or more than the melting point of the wax or resin, preferably more than the melting point, and agitated to produce an O/W emulsion. Then, the emulsion is cooled to a temperature less than the melting point of the wax or resin. Preferably, the emulsion is cooled to a temperature that is lower than the melting point of the wax or resin by 20° C. or further lower. Thus, a water-dispersion is prepared In the emulsion-dispersion method, it is preferable to utilize phase inversion emulsification when it is desired to obtain a water dispersion having a small particle size and a narrow particle size distribution. Emulsion dispersion utilizing phase inversion emulsification can be performed in the following manner, for example. Wax or resin and water-soluble fatty acid soap are fed into a dispersing container and heated to a temperature equal to or more than the melting point of the wax or resin so that the system becomes liquid. Then, water or warm water drops therein gradually under agitation. In this method, as the amount of dropped water increases, phase inversion from a W/O emulsion to an O/W emulsion occurs in the system, so that an emulsion having a small particle size and a narrow particle size distribution can be obtained. In another phase inversion emulsification method, wax or resin is dissolved in a good solvent, then a small amount of water is added so that the resultant mixture is emulsified. Next, water is added thereto to cause phase inversion, and then the solvent is removed.

The emulsion polymerization method refers to a method where a monomer that can be polymerized in water while keeping the form of an emulsion, e.g., vinyl monomer, is polymerized in water in the form of an emulsion so as to produce a water dispersion of resin particles. In this method, water and a water-soluble polymerization initiator are fed into a reaction vessel, and the monomer is emulsified with water-soluble fatty acid soap or another emulsifier in an inert gas atmosphere, such as nitrogen, and heated so that the monomer is polymerized in the form of an emulsion. Thus, a water dispersion of the polymer can be produced. In the case where the water-soluble fatty acid soap cannot be used during the emulsion polymerization for pH or emulsion stability reasons, a predetermined amount of the water-soluble fatty acid soap can be added after the emulsion polymerization.

When an oil-soluble initiator is used instead of the water-soluble initiator, the monomer is polymerized in the form of a suspension, and a water dispersion comprising resin particles having a relatively large particle size can be obtained. The water dispersion of the resin particles obtained by such suspension polymerization can be used as the dispersion (a) used in the present invention.

Among these methods for preparing the dispersion (a), the emulsion dispersion method and the emulsion polymerization method are preferable because they can provide a water dispersion of microparticles that have a spherical shape and good handling properties.

In the method for coating wax or resin particles with metallic soap of the present invention, the dispersion (a) and the aqueous solution or the water dispersion of the polyvalent metal compound (b) (hereinafter, may be referred to as liquid (b)) can be mixed in one of the following two methods: a method of dripping the dispersion (a) and liquid (b) into a reaction vessel (hereinafter, referred to as "dripping method"); and a method of mixing the dispersion (a) and liquid (b) simultaneously and rapidly (hereinafter, referred to as "continuous mixing method").

The dripping method includes sequential mixing, namely, dripping the liquid (b) into the dispersion (a) in agitation, or dripping and mixing the dispersion (a) into the liquid (b) in agitation; and simultaneous dripping-mixing, namely, dripping and mixing the dispersion (a) and liquid (b) simultaneously. The simultaneous dripping-mixing method is preferable, because the surfaces of wax or resin particles can be coated with metallic soap uniformly and densely.

The method of dripping the dispersion (a) and liquid (b) simultaneously into a reaction vessel is performed more specifically in the following manner. The dispersion (a) having a temperature of 0 to 100° C., preferably 20 to 90° C., and the dispersion (b) having a temperature of 10 to 50° C. are dripped simultaneously into a reaction vessel, where agitation is performed by a paddle agitator, a homogenizer, a ball mill or other known agitating apparatus. The temperature of the mixed system is preferably equal to or less than the melting point of the wax or resin particles present in the dispersion (a). Preferably, the temperature is lower than the melting point of the wax or resin particles by 20 ° C. or further lower. When the temperature is higher than the melting point, the wax or resin particles becomes liquid, or the surface conditions of the particles are changed, and thus, sufficient coating may not be attained.

The dripping rate of the dispersion (a) and liquid (b) is adjusted so that the equivalent ratio of the amount of the Erg polyvalent metal ions in the supplied liquid (b) with respect to the amount of the water-soluble fatty acid soap in the supplied dispersion (a) is 0.5 to 1.5, preferably 0.8 to 1.2. In this simultaneous dripping method, in order to perform uniform coating with the metallic soap it is preferable to start dripping the dispersion (a) and liquid (b) simultaneously, drip the dispersion (a) and liquid (b) at a constant dripping period, and end dripping simultaneously. There is no limitation regarding a period of time required by dripping. However, the slower the dripping rate is, the more uniformly the wax or resin particles can be coated with the metallic soap.

The continuous mixing method employs an apparatus or a tube having at least three openings, i.e., an inlet port for each of the dispersion (a) and liquid (b) and an outlet port for the resultant mixture, and also having a mixing compartment where the dispersion (a) and liquid (b) are mixed momentarily. Examples of such a mixing apparatus include a T-shaped tube, a Y-shaped tube, a line mixer having at least two inlet ports for raw materials, and a line homogenizer having at least two inlet ports for raw materials.

For mixing, the dispersion (a) and liquid (b) are supplied to the inlet port for the dispersion (a) and the inlet port for the liquid (b), respectively, by gravitation, suction, pressurization or other methods. The temperature of each of the dispersion (a) and liquid (b) is preferably equal to or lower than the melting point of the wax or resin by 20° C. or further lower.

The supply rate is adjusted so that the equivalent ratio of the amount of the polyvalent metal ions in the liquid (b) with respect to the amount of the water-soluble fatty acid soap in the dispersion (a) is 0.5 to 1.5, preferably 0.8 to 1.2. In the case where the mixing apparatus is a T-shaped tube or a Y-shaped tube, simply performing supply allows the dispersion (a) and liquid (b) to be mixed momentarily at a portion where the inlet tube for the dispersion (a) meets the inlet tube for the liquid (b). In the case of power dispersing machines such as a line mixer or a line homogenizer, dispersion is performed and then immediate mixing is performed at the dispersing machine portion.

In the continuous mixing method, the mixture of the dispersion (a) and liquid (b) is discharged from the outlet port sequentially, so that a relatively small apparatus is sufficient for a large amount of mixture.

Among these two mixing methods, continuous mixing is preferable because it is possible to achieve a more uniform coating with more dense metallic soap, and the mixing apparatus is small and convenient. In particular, the method that uses the T-shaped tube or the Y-shaped tube as the mixing portion is advantageous in that no agitating apparatus is required, little power is consumed, the mixing apparatus portion is small, and cleaning is easy.

Next, the mixture of the dispersion (a) and liquid (b) is aged in a container with an agitator, if necessary, and then fed into a known solid-liquid separator such as a filtering machine or a centrifugal separator, and then washed with water or an organic solvent so that unreacted water-soluble fatty acid salt, unreacted polyvalent metal compound, or other impurities are removed. Thus, a washed cake is obtained.

The thus obtained washed cake is dried by a known drying method utilizing heat, reduced pressure, or blowing so that the residual moisture is removed. The temperature during drying is preferably lower than the lowest melting point of the melting points of the wax or resin and the coating metallic soap. When a temperature equal to or more than that temperature is used, the wax or resin particles coated with the metallic soap are likely to cause blocking. Among these drying methods, reduced pressure drying is preferable, because drying can be performed at a low temperature and swiftly.

The above-described methods provide the particles coated with the metallic soap. By the use of the present method, the wax or resin particles can be coated with metallic soap uniformly and densely even when the wax or resin particles have a small particle size. The obtained metallic-soap-coated wax or resin particles have excellent anti-blocking properties. Therefore, the coated particles can be used in various industrial fields as toners for electrophotography, or in medicine and pharmacy, cosmetics, and resin processing.

EXAMPLES

Hereinafter, the present invention will be described by way of examples with reference to the accompanying drawings, but the examples are only illustrative and do not limit the present invention.

Examples of Preparation of Dispersion (a): Water Dispersion of Wax or Resin Particles 1. Preparation Examples of Dispersion (a) by the Emulsion Dispersion Method 1.1. Water dispersion 1

First, 48 g of pentaerythritol tetrabehenate as wax, 2 g of sodium stearate as water soluble fatty acid soap, and 450 g of water were fed into a 1-liter beaker and warmed to 80° C. so that the pentaerythritol tetrabehenate was dissolved. Then, emulsion dispersion was performed by an autohomomixer (Type TK; manufactured by Tokushu kika Kogyo KK.; hereinafter, referred to as TK auto homomixer) at 7000 rpm for 15 minutes. Thereafter, the emulsion was cooled to 20° C. over 1 hour so that a water dispersion of wax particles of pentaerythritol tetrabehenate (solid content 10 wt %) having an average particle size of 10 $\mu$m was obtained in an amount of 500 g. Furthermore, the water dispersion was diluted with water to twice as much so that water dispersion 1 of 5 wt % of wax particles, the dispersion containing 0.2 wt % of water-soluble fatty acid soap, was obtained.

1.2. Water dispersions 2 and 3

Water dispersions 2 and 3 of 5 wt % of wax particles, each dispersion of which contains 0.2 wt % of water-soluble fatty acid soap, were prepared in the same manner as the process of preparing the water dispersion 1 by using the wax or resins and the water-soluble fatty acid soaps shown in Nos.2 and 3 respectively in Table 1.

2. Preparation Examples of Dispersion (a) by the Phase Inversion Emulsification Method 2.1. Water dispersion 4

First, 240 g of behenyl behenate and 9.6 g of sodium myristate were fed into a 1-liter three-necked flask and warmed to 90° C. under agitation by a paddle agitator so as to be melted and mixed. Then, phase inversion emulsification was performed by dripping 90° C. warm water in an amount of 550.4 g over 1 hour. Thereafter, the emulsion was cooled to 20° C. over 1 hour so that a water dispersion of 30 wt % of particles of behenyl behenate, having an average particle size of 7 $\mu$m, was obtained in an amount of 800 g. Furthermore, 167 g of the water dispersion was diluted with 333 g of water so that a water dispersion of 10 wt % of particles of behenyl behenate, having an average particle size of 7 $\mu$m, was obtained in an amount of 500 g. In this way, water dispersion 4 of 10 wt % of wax particles, the dispersion containing 0.4 wt % of water-soluble fatty acid soap, was prepared. 2.2. Water dispersions 5 and 6

Water dispersions 5 and 6 of 10 wt % of wax or resin particles were prepared in an amount of 500 g each in the same manner as the process of preparing water dispersion 4 by using the wax or resins and water-soluble fatty acid soaps shown in 5 and 6 of Table 1.

3. Preparation Examples of Dispersion (a) by the Forced Dispersion Method 3.1. Water dispersion 7

First, 75 g of paraffin wax having an average particle size of 17 $\mu$m, 4 g of potassium stearate and 421 g of water were fed into a 1-liter beaker. Then, the resultant mixture was agitated to prepare a dispersion by TK auto homomixer at 1500 rpm for 15 minutes. Thereafter, the resultant dispersion was cooled to 20° C. over 1 hour so that a water dispersion of 15 wt % of particles of paraffin wax, having an average particle size of 17 $\mu$m, was obtained in an amount of 500 g. Thus, water dispersion 7 of 15 wt % of wax particles, the dispersion containing 0.8 wt % of water-soluble fatty acid soap, was prepared.

3.2. Water dispersions 8 to 12

Water dispersions 8 to 12 of 5–15 wt % of wax or resin particles were prepared in an amount of 500 g each in the same manner as the process of preparing water dispersion 7 by using the wax or resins and water-soluble fatty acid soaps shown in 8 to 12 of Table 1.

4. Preparation Examples of Dispersion (a) by the Emulsion Polymerization Method

Water dispersion 13

First, 395. 82 g of water, 0.18 g of potassium persulfate and 4 g of potassium oleate were fed into a 1-liter four-necked flask and warmed to 70° C. and 100 g of styrene was dripped thereto over 1 hour with bubbling of nitrogen while agitating. Then the mixture was aged for 2 hours to complete polymerization and then cooled to 20° C. over 30 minutes so that a water dispersion of 20 wt % of particles of polystyrene, having an average particle size of 12 μm, was obtained in an amount of 500 g. Furthermore, the water dispersion was diluted with water to twice as much so as to produce a 10 wt % water dispersion. Thus, water dispersion 13 of 10 wt % of resin particles containing 0.4 wt % of water-soluble fatty acid soap was prepared.

5. Preparation Examples of Dispersion (a) by the Suspension Polymerization Method Water dispersion 14

First, 370 g of water, 125 g of butyl methacrylate, 2 g of lauroyl peroxide, 1.5 g of polyvinyl alcohol, and 0.2 g of sodium laurate were fed into a 1-liter four-necked flask and warmed to 70° C., and suspension polymerization was caused over 3 hours under a stream of nitrogen while agitating. Thereafter, the resultant mixture was warmed to 80° C. and aged for 2 hours. Then, the reaction mixtere was cooled to 60° C. under agitation. Then, 1.3 g of sodium laurate was added thereto, and the resultant mixture was cooled to 20° C. over 30 minutes so that a water dispersion of 25 wt % of particles of polybutyl methacrylate, having an average particle size of 80 μm, was obtained in an amount of 500 g. Thus, water dispersion 14 of 25 wt % of resin particles, the dispersion containing 0.3 wt % of water-soluble fatty acid soap, was prepared.

6. Preparation Examples of Dispersion (a) by a Wet Toner Particle Dispersion

Water dispersion 15

First, 117 g of styrene, 10 g of a cyanogen colorant (copper phthalocyanine pigment with an average particle size of 0.3 μm) and 5 g of a negatively-charged control agent (di-tertiary butyl salicylate metal compound with an average particle size of 0.3 μm) were fed into a 500 ml beaker and agitated by TK auto homomixer at 500 rpm for 3 hours. Then, 23 g of n-butyl acrylate, 10 g of saturated polyester resin (with a number average molecular weight of about 7000 and an acid number of 16 mg/g) and 40 g of 1,4-butanediol distearate were added to the obtained mixture, and the mixture was agitated with a paddle agitator for 2 hours while being warmed to 60° C. Thereafter, the agitating apparatus was replaced by a TK auto homomixer and 12 g of a polymerization initiator, i.e., 2,2'-azobis(2,4-dimethyl valeronitrile), was added thereto. Then, the resultant mixture was agitated at 200 rpm for 1 minute so that a polymeric monomer composition was prepared.

Separately, 710 g of ion-exchanged water and 540 g of 0.1 M-$Na_3PO_4$ aqueous solution were fed into a 2-liter separable flask, warmed to 60° C. and then agitated at 12000 rpm by TK auto homomixer. To this mixture, 80 g of 1.3 M-$CaCl_2$ aqueous solution was added gradually, so that an aqueous mixture containing $Ca_3(PO_4)_2$ microparticles was prepared.

The polymeric monomer composition was fed into the above-mentioned aqueous mixture, and agitated at 60° C. in a nitrogen atmosphere at 10000 rpm by TK auto homomixer for 10 minutes so that the particles contained in the polymeric monomer composition was pulverized. Thereafter, the mixture was warmed to 70° C. under agitation by a paddle agitator and was subjected to a suspension polymerization reaction for 11 hours so that a styrene-n-butyl acrylate copolymer was formed in the particles.

After the polymerization reaction was completed, the reaction mixture was cooled and hydrochloric acid was added thereto, and the calcium phosphate contained in the resultant mixture was dissolved. Then, filtering, water washing and drying were performed so that wet cake of cyanogen toner particles having an average particle size of 7 μm were obtained. The surfaces of the cyanogen toner particles were measured by a X-ray micro analyzer, and the measurement had confirmed that no peak based on Ca was detected.

Then, 75 g of the thus-obtained cyanogen toner particles, 2 g of potassium stearate and 423 g of water were fed into a 1-liter beaker and dispersed by TK auto homomixer at 1500 rpm for 15 minutes. Thereafter, the dispersion was cooled to 20° C. over one hour so as to produce 500 g of a water dispersion of 15 wt % of the cyanogen toner particles having an average particle size of 7 μm. Thus, water dispersion 15 of 15 wt % of toner particles, the dispersion containing 0.4 wt % of water-soluble fatty acid soap, was prepared.

Table 1 shows the water dispersions 1 to 15 prepared in the above-described manners.

TABLE 1

| Water-dispersion No. | Wax or resin | Melting point of wax or resin | Water-soluble fatty acid soap | Amount of water-soluble fatty acid soap (*a) | Dispersion preparative method | Water dispersion concentration (wt %) | Average particle size (μm) |
|---|---|---|---|---|---|---|---|
| 1 | Pentaerythritol tetrabehenate | 82 | Sodium stearate | 4 | Emulsion dispersion | 5 | 10 |
| 2 | Carnauba wax | 83 | Potassium palmitate | 4 | Emulsion dispersion | 5 | 24 |
| 3 | Distearyl phthalate | 83 | Sodium oleate | 4 | Emulsion dispersion | 5 | 8 |
| 4 | Behenyl behenate | 74 | Sodium myristate | 4 | Phase inversion emulsification | 10 | 7 |
| 5 | Pentaerythritol distearate | 77 | Potassium laurate | 4 | Phase inversion emulsification | 10 | 9 |
| 6 | 1,4-Butanediol distearate | 69 | Sodium palmitate | 4 | Phase inversion emulsification | 10 | 7 |
| 7 | Paraffin wax | 107 | Potassium stearate | 5 | Forced dispersion | 15 | 17 |

TABLE 1-continued

| Water-dispersion No. | Wax or resin | Melting point of wax or resin | Water-soluble fatty acid soap | Amount of water-soluble fatty acid soap (*a) | Dispersion preparative method | Water dispersion concentration (wt %) | Average particle size (μm) |
|---|---|---|---|---|---|---|---|
| 8 | Ethylene bis(stearamide) | 140 | Ammonium stearate | 5 | Forced dispersion | 15 | 25 |
| 9 | Rice wax | 74 | Triethanolamine laurate | 5 | Forced dispersion | 15 | 15 |
| 10 | Dipentaerythritol hexamyristate | 66 | Sodium stearate | 4 | Forced dispersion | 5 | 100 |
| 11 | Polypropylene | 160 | Sodium palmitate | 4 | Forced dispersion | 10 | 350 |
| 12 | Polyvinyl chloride | 170 | Potassium stearate | 3 | Forced dispersion | 15 | 150 |
| 13 | Polystyrene | 135 | Potassium oleate | 4 | Emulsion polymerization | 10 | 12 |
| 14 | Polybutyl methacrylate | 85 | Sodium laurate + polyvinyl alcohol | 1 | Suspension polymerization | 25 | 80 |
| 15 | Wet toner | 155 | Potassium stearate | 3 | Wet toner production | 15 | 7 |

*a: parts by weight per 100 parts by weight of wax or resin particles

EXAMPLES 1 TO 16

Wax or resin particles were coated with metallic soap by using 500 g of the dispersion (a) obtained in the above-described manners (water dispersions 1 to 15) and 500 g of liquid (b) shown in Table 2. The temperature of the liquid (b) was equal to the room temperature. Table 2 shows the mixing conditions for the coating reaction of the present invention (the polyvalent metal compound used, the equivalent ratio of the polyvalent metal compound to the water-soluble fatty acid soap, the mixing method, and the temperature of the dispersion (a) when the dispersion (a) is mixed with the liquid (b)).

in 10 seconds. After the entire amount was fed, aging was performed for 10 minutes while keeping the temperature stable so as to complete the reaction.

Next, the thus-obtained slurry was filtered. Then, the obtained wet cake was washed with water twice. The washed cake was dried by vacuum drying at 50° C. for 6 hours so that dry particles of the coated wax or resin were obtained.

<Mixing method B>

A pipeline homomixer that can supply the dispersion (a) and liquid (b) separately with a metering pump and mix the two components, and a 2-liter receptacle with an agitating device having a paddle agitator of a diameter of 6 cm were

TABLE 2

| | | Liquid (b) | | | Mixing process | |
|---|---|---|---|---|---|---|
| No. | Dispersion (a) | Polyvalent metal compound | Concentration (wt %) | Equivalent ratio α | Mixing method | Temperature (° C.) of dispersion (a) |
| Ex. 1 | Water dispersion 1 | Calcium chloride | 0.037 | 1.03 | B | 70 |
| Ex. 2 | Water dispersion 2 | Iron (III) chloride | 0.044 | 1.20 | B | 75 |
| Ex. 3 | Water dispersion 3 | Magnesium chloride | 0.030 | 0.95 | B | 70 |
| Ex. 4 | Water dispersion 4 | Zinc sulfate | 0.142 | 1.10 | A | 65 |
| Ex. 5 | Water dispersion 5 | Nickel chloride | 0.114 | 1.05 | A | 60 |
| Ex. 6 | Water dispersion 6 | Copper (II) chloride | 0.145 | 1.50 | B | 55 |
| Ex. 7 | Water dispersion 7 | Calcium chloride | 0.138 | 1.00 | B | 85 |
| Ex. 8 | Water dispersion 8 | Zinc nitrate | 0.289 | 1.15 | B | 90 |
| Ex. 9 | Water dispersion 9 | Silver nitrate | 0.398 | 1.02 | A | 60 |
| Ex. 10 | Water dispersion 10 | Calcium chloride | 0.037 | 1.03 | A | 30 |
| Ex. 11 | Water dispersion 11 | Copper (II) chloride | 0.145 | 1.50 | A | 10 |
| Ex. 12 | Water djspersion 12 | Zinc sulfate | 0.054 | 1.03 | B | 20 |
| Ex. 13 | Water dispersion 13 | Zinc sulfate | 0.099 | 0.98 | B | 65 |
| Ex. 14 | Water dispersion 14 | Calcium chloride | 0.094 | 1.25 | A | 70 |
| Ex. 15 | Water dispersion 15 | Calcium chloride | 0.074 | 1.07 | B | 65 |
| Ex. 16 | Water dispersion 1 | Zinc sulfate | 0.054 | 1.03 | dripping liquid (b) | 70 |

α: Equivalent ratio of polyvalent metal compound in liquid (b) to water-soluble fatty acid soap in dispersion (a)

The mixing methods A and B in Examples 1 to 15 shown in Table 2 are as follows.

<Mixing method A>

A 2-liter receptacle with an agitating device having a paddle agitator of a diameter of 6 cm was prepared, and the paddle agitator was rotated at 350 rpm. The dispersion (a) and liquid (b) adjusted to the temperatures shown in Table 2 were fed into this receptacle simultaneously from different directions. The feeding of the entire amount was completed prepared, and the paddle agitator was rotated at 350 rpm. The dispersion (a) adjusted to the temperatures shown in Table 2 and liquid (b) were supplied into the pipeline homomixer separately, and the resultant mixture discharged from the pipeline homomixer was fed into the receptacle. The flow rate of the dispersion (a) and liquid (b) was adjusted by the metering pump so that the supply of the dispersion (a) and liquid (b) could end at the same time. The mixing of the entire amount was completed in 10 minutes.

After the mixed solution was discharged from the outlet port of the pipeline mixer to the receptacle, aging was performed for 10 minutes in the receptacle under agitation while keeping the temperature stable so as to complete the reaction.

Next, the thus-obtained slurry was filtered. Then, the obtained wet cake was washed with water twice, and the washed cake was dried by vacuum drying at 50° C. for 6 hours so that dry particles of the coated wax or resin were obtained.

The liquid (b) of Example 16 was dripped in the following manner.

First, 500 g of water dispersion 1 as the dispersion (a) was fed into a 2-liter beaker, and 500 g of an aqueous solution of zinc phosphate as the liquid (b) (the equivalent ratio of the zinc phosphate with respect to the water-soluble fatty acid soap in the dispersion (a) was 1.03) was dripped thereto at 70° C. over 1 hour under agitation. Thereafter, the resultant slurry was filtered, and the obtained wet cake was washed twice. Then, the washed cake was dried by vacuum drying at 50° C. for 6 hours so that dried particles were obtained.

Comparative Example 1: A Conventional Wet Type Mixing Method

First, 1200 g of water dispersion 1 was fed into 9000 g of ethanol at 20° C., and the mixture was agitated and filtered. The filtered wet cake was further washed with ethanol in an amount ten times as much and filtered. This operation was repeated three times to prepare a washed cake, and the washed cake was dried by vacuum drying at 50° C. for 6 hours. Thus, dried spherical particles of pentaerythritol tetrabehenate free from sodium stearate, which is the water-soluble fatty acid soap, were obtained in an amount of 50 g.

Next, 48 g of the dry spherical particles, 2 g of calcium stearate (having an average particle size of 7 $\mu$m) and 360 g of water were mixed and dispersed by TK auto homomixer at 1500 rpm for 15 minutes. Thus, a 10 wt % water dispersion containing 2 g of calcium stearate was obtained in an amount of 400 g. This water dispersion was filtered, and the resultant wet cake was dried by vacuum drying at 50° C. for 6 hours. Thus, dried particles of Comparative Example 1 were obtained.

Comparative Example 2: A Conventional Dry Type Mixing Method

In this comparative example, 48 g of dry spherical particles of pentaerythritol tetrabehenate obtained in the same manner as in Comparative Example 1 and 2 g of calcium stearate (having an average particle size of 7 $\mu$m) were fed into a mixer for household use and mixed by the mixer at a high rotation rate for 3 minutes. Then, the resultant powder was removed from the mixer to be used as dried particles of Comparative Example 2.

Comparative Example 3: A Conventional Dry Type Mixing Method

In this comparative example, 950 g of ethylene bis (stearamide) having an average particle size of 25 $\mu$m and 50 g of zinc stearate (with an average particle size of 21 $\mu$m) were fed into a 10-liter High Speed mixer(Mitsui Mining Co., Ltd.) and agitated at room temperature at 1000 rpm for 30 minutes. The resultant powder was removed from the mixer to be used as dried particles of Comparative Example 3.

Next, it was examined whether or not and how the surfaces of the particles obtained by the above examples and comparative examples were coated with metallic soap. How the surfaces of the particles were coated with metallic soap (i.e., coating state) was observed by visual observation through an electron microscope.

Observation of the Coating State of the Surfaces by an Electron Microscope

The microparticle powders of Examples 1 to 16 and Comparative Examples 1 to 3 were magnified to the 5000-fold size by an electron microscope (Scanning Electron Microscope S-2100 manufactured by Hitachi Ltd.) to observe the surfaces of the wax or resin particles and were evaluated by visual observation.

Figure 2:
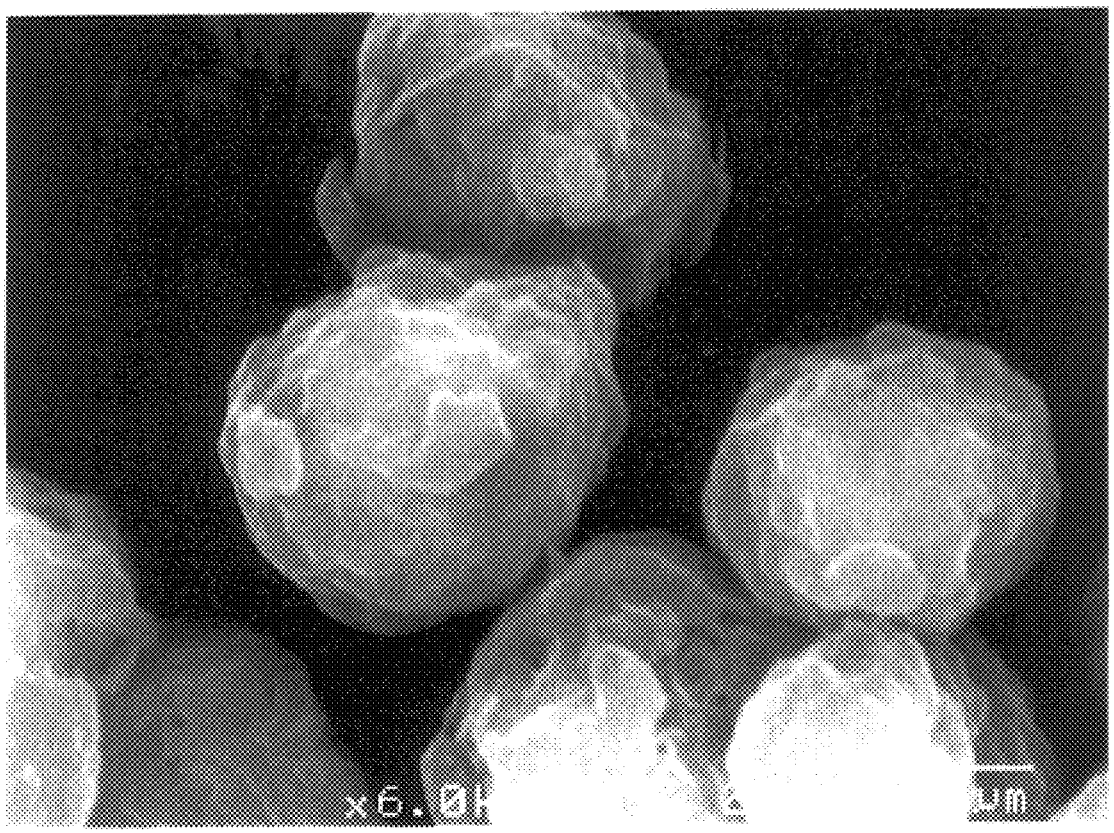
FIG. 2 is an electron micrograph showing the surface structure of microparticles coated with metallic soap of the present invention obtained in Example 1.
Figure 3:
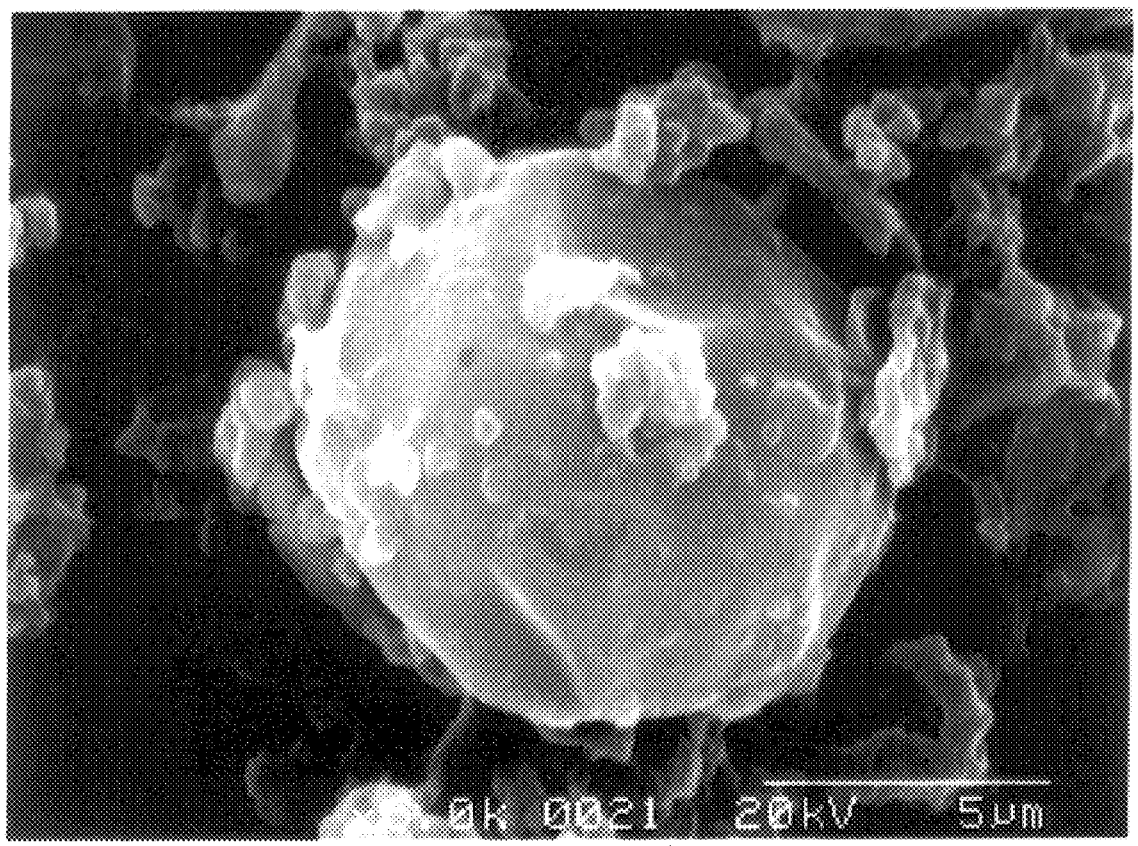
FIG. 3 is an electron micrograph showing the surface structure of comparative wax particles treated with metallic soap obtained in Comparative Example 1.
Figure 4:
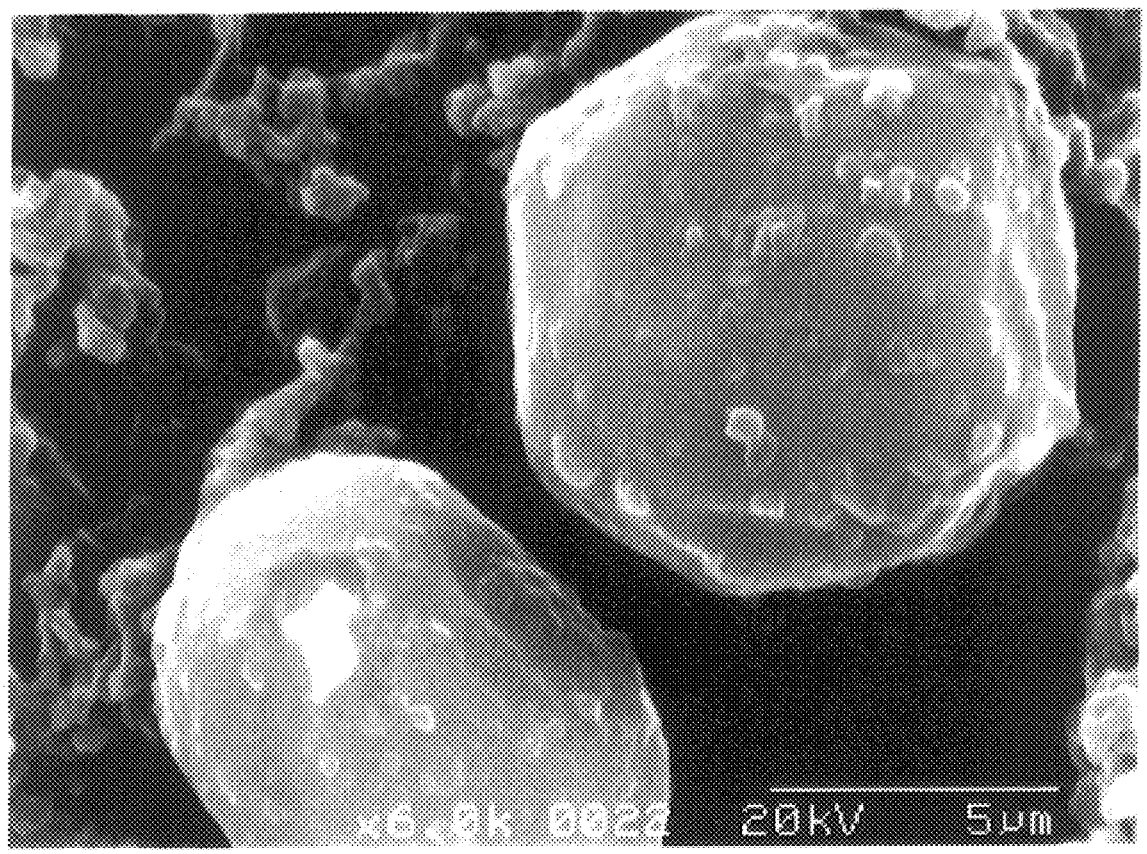
FIG. 4 is an electron micrograph showing the surface structure of comparative wax particles treated with metallic soap obtained in Comparative Example 2.

FIG. 1 is an electron micrograph showing the surface structure of the wax particles in water dispersion 1 without any treatment. The surfaces were smooth. FIG. 2 is an electron micrograph showing the surface structure when the metallic soap treatment is performed to these wax particles by the method of Example 1. The surfaces of the wax particles obtained in Example 1 were covered with a scaly coating of metallic soap uniformly and satisfactorily. On the other hand, the electron micrograph of FIG. 3 showing the coating state by the conventional wet type mixing method reveals that the surfaces of the wax particles were only coated partially with metallic soap. The electron micrograph of FIG. 4 showing the coating state by the conventional dry type mixing method reveals that the metallic soap particles are present among the wax particles. In both the conventional methods, the particle surfaces were not coated uniformly.

The coating states of Examples 1 to 16 and Comparative Examples 1 to 3 were evaluated based on the following three criteria.

A: The surfaces of the wax or resin particles are coated uniformly with the metallic soap.
B: The surfaces of the wax or resin particles are coated partially with the metallic soap.
C: The surfaces of the wax or resin particles are not coated, and the metallic soap particles are present among the wax or resin particles.

Table 3 shows the results.

Whether or not the particle surfaces were coated with the metallic soap was evaluated by measuring the particle surfaces with a X-ray microanalyzer (EMAX-1770: S-233 manufactured by HORIBA Ltd.). The evaluation was performed based on the following three criteria by measuring the presence of metal ions.

A: Peaks of metal ions derived from the metallic soap that are expected to be produced are significantly detected.
B: Peaks of metal ions derived from the metallic soap that are expected to be produced are slightly detected.
C: Peaks of metal ions derived from the metallic soap that are expected to be produced are not substantially detected.

The metal ions derived from the metallic soap that are expected to be produced are derived from the polyvalent metal salt (i.e., polyvalent metal compound) that was used in the process of the production, and they are removed when the particles are washed with water. Therefore, if the metallic soap is not produced, the metal ions are not detected.

Table 3 shows the results of examining the coating states by visual observation through the electron microscope and the presence of the metallic soap.

TABLE 3

| No. | Coating state | Presence of metallic soap on the surfaces | Particle appearance |
|---|---|---|---|
| Example 1 | A | A | scaly coating |
| Example 2 | A | A | scaly coating |
| Example 3 | A | A | scaly coating |
| Example 4 | A | A | scaly coating |
| Example 5 | A | A | scaly coating |
| Example 6 | A | A | scaly coating |
| Example 7 | A | A | scaly coating |
| Example 8 | A | A | scaly coating |
| Example 9 | A | A | scaly coating |
| Example 10 | A | A | scaly coating |
| Example 11 | A | A | scaly coating |
| Example 12 | A | A | scaly coating |
| Example 13 | A | A | scaly coating |
| Example 14 | A | A | scaly coating |
| Example 15 | A | A | scaly coating |
| Example 16 | B | A | partial scaly coating |
| Comparative example 1 | B | B | partial adherence of metallic soap |
| Comparative example 2 | C | C | metallic soap present among particles |
| Comparative example 3 | C | C | metallic soap present among particles |

As seen from Table 3, according to the method of the present invention, the wax or resin particles are coated uniformly with a scaly coating of metallic soap, and especially when the dispersion (a) and liquid (b) are mixed simultaneously, the particles are coated even more uniformly. On the other hand, in Comparative Examples 1 to 3, where the metallic soap is added and then mixed with the wax or resin particles from the beginning by the conventional wet or dry type mixing method, the particles are not sufficiently coated with the metallic soap.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for coating wax or resin particles with metallic soap,
    wherein (a) a water dispersion of wax or resin particles, the dispersion containing water-soluble fatty acid soap, and (b) an aqueous solution or a water dispersion of a polyvalent metal salt are mixed in such a manner that an equivalent ratio of the polyvalent metal salt to the water-soluble fatty acid soap is 0.5 to 1.5.

2. The method for coating wax or resin particles according to claim 1, wherein the wax or resin particles are contained in an amount of 0.1 to 50 wt % in the water dispersion (a) of wax or resin particles, and the water-soluble fatty acid soap is contained in an amount of 0.1 to 20 parts by weight per 100 parts by weight of the wax or resin particles.

3. The method for coating wax or resin particles according to claim 2, wherein the polyvalent metal salt is contained in an amount of 0.01 to 30 wt % in the aqueous solution or the water dispersion (b).

4. Wax or resin particles substantially uniformly coated with a metallic soap obtained by:
    mixing (a) a water dispersion of wax or resin particles, the dispersion containing water-soluble fatty acid soap, and (b) an aqueous solution or a water dispersion of a polyvalent metal salt in such a manner that an equivalent ratio of the polyvalent metal salt to the water-soluble fatty acid soap is 0.5 to 1.5; and
    recovering the resultant wax or resin particles coating with a metallic soap formed on the surface of the particles.

5. The wax or resin particles according to claim 4, wherein the water-soluble fatty acid soap is an alkali metal salt comprising 4 to 30 carbon atoms.

6. The wax or resin particles according to claim 4, wherein the water-soluble fatty acid soap is an ammonium salt comprising 4 to 30 carbon atoms.

7. The wax or resin particles according to claim 4, wherein the water-soluble fatty acid soap is a water-soluble amine salt comprising 4 to 30 carbon atoms.

8. The wax or resin particles according to claim 4, wherein the polyvalent metal salt is a bivalent metal salt.

9. A method for coating wax or resin particles with metallic soap, comprising:
    mixing (a) a water dispersion of wax or resin particles, the dispersion containing water-soluble fatty acid soap, and (b) an aqueous solution or a water dispersion of a polyvalent metal salt in such a manner that an equivalent ratio of the polyvalent metal salt to the water-soluble fatty acid soap is 0.8 to 1.2.

10. The method for coating wax or resin particles according to claim 9, wherein the water-soluble fatty acid soap is an alkali metal salt comprising 4 to 30 carbon atoms.

11. The method for coating wax or resin particles according to claim 9, wherein the water-soluble fatty acid soap is an ammonium salt comprising 4 to 30 carbon atoms.

12. The method for coating wax or resin particles according to claim 9, wherein the water-soluble fatty acid soap is a water-soluble amine salt comprising 4 to 30 carbon atoms.

13. The method for coating wax or resin particles according to claim 9, wherein the polyvalent metal salt is a bivalent metal salt.

14. The method for coating wax or resin particles according to claim 9, wherein the wax or resin particles are contained in an amount of 0.1 to 50 wt % in the water dispersion (a) of wax or resin particles, and the water-soluble fatty acid soap is contained in amount of 0.1 to 20 parts by weight per 100 parts by weight of the wax or resin particles.

15. The method for coating wax or resin particles according to claim 14, wherein the polyvalent metal salt is contained in an amount of 0.01 to 30 wt % in the aqueous solution or the water dispersion (b).

* * * * *